US011777890B2

(12) United States Patent
Gulik

(10) Patent No.: US 11,777,890 B2
(45) Date of Patent: *Oct. 3, 2023

(54) COMPUTERIZED SYSTEMS AND METHODS FOR A MESSAGE FREQUENCY AND CONTROL ASSISTANT

(71) Applicant: YAHOO ASSETS LLC, Dulles, VA (US)

(72) Inventor: Tom Gulik, Santa Clara, CA (US)

(73) Assignee: YAHOO ASSETS LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/382,776

(22) Filed: Jul. 22, 2021

(65) Prior Publication Data

US 2021/0352033 A1 Nov. 11, 2021

Related U.S. Application Data

(63) Continuation of application No. 16/154,849, filed on Oct. 9, 2018, now Pat. No. 11,075,872, which is a continuation of application No. 14/045,561, filed on Oct. 3, 2013, now Pat. No. 10,110,532.

(51) Int. Cl.
*H04L 51/42* (2022.01)
*H04L 51/216* (2022.01)

(52) U.S. Cl.
CPC ........... *H04L 51/42* (2022.05); *H04L 51/216* (2022.05)

(58) Field of Classification Search
CPC .......................... H04L 51/42; H04L 51/216

USPC ......................................................... 709/206
See application file for complete search history.

(56) References Cited

U.S. PATENT DOCUMENTS

| | | | |
|---|---|---|---|
| 7,831,676 B1 | 11/2010 | Nagar | |
| 8,375,100 B1 | 2/2013 | Rivera | |
| 9,619,783 B2 | 4/2017 | Madnani | |
| 2005/0193076 A1 | 9/2005 | Flury et al. | |
| 2006/0031324 A1 | 2/2006 | Chen et al. | |
| 2006/0168057 A1* | 7/2006 | Warren | H04L 51/212 709/206 |
| 2007/0226658 A1* | 9/2007 | Virk | H04L 51/58 715/864 |
| 2009/0239504 A1 | 9/2009 | Turk | |
| 2010/0070584 A1 | 3/2010 | Chen et al. | |

(Continued)

OTHER PUBLICATIONS

Leswing, "Silence Is Golden: A Guide to Blocking Calls and Texts in iOS 7", wired.com, Sep. 19, 2013, 5 pages (Year: 2013).*

(Continued)

*Primary Examiner* — Wing F Chan
*Assistant Examiner* — Leon Y Tseng
(74) *Attorney, Agent, or Firm* — James J. DeCarlo; Greenberg Traurig, LLP

(57) ABSTRACT

An email system is configured to enable a user to identify frequent email senders and block or consolidate emails from such senders. The emails received within a predetermined time period from a sender, who is selected for consolidation by a user of an email account, are consolidated into one entry in the inbox. This mitigates the inbox from getting overcrowded with frequent emails from various senders. Statistics related to various senders are also generated in order to aid the user in identifying senders whose emails need to be consolidated or blocked.

20 Claims, 13 Drawing Sheets

(56) References Cited

U.S. PATENT DOCUMENTS

2013/0246540 A1    9/2013   Kubota
2015/0052177 A1    2/2015   Roseman et al.

OTHER PUBLICATIONS

Accucode, The advantage of conversation view, Mar. 14, 2012, sites.google.com/a/accucode.com (5 pages).

Microsoft, "Manage email messages by using rules", saved from support.office.com on Nov. 27, 2017 (5 pages).

Kaelin, Quick Tip: Change the conversation view in Gmail, Jun. 20, 2011, TechRepublic (8 pages).

* cited by examiner

| YAHOO! MAIL | | | Search Mail | | |
|---|---|---|---|---|---|
| INBOX | CONTACTS | CALENDAR | Search Web | | Hi, Tom ⚙ 🏠 |
| ✉ Compose ▾ | 🗑 Delete | 🗀 Move ▾ | ⊗ Spam ▾ | ⚙ Actions ▾ | ◁◁ ◁ 1 ▷ ▷▷ |
| All Contacts | ▾ SORT BY DATE | | | | DATE |
| Inbox (1) | ☐ Maker Shed | Geeky Moms Rule at the Shed! Check out our Selection of Cool Mothe... | | | Thu, 5:57 PM |
| Conversations | ☐ ThinkGeek Overlords | ThinkGeek's May the Fourth celebration | | | Thu, 9:42 AM |
| Drafts | ☐ Instructables | DIY Laser Engraver, Fake Self-Driving Car, Pick Locks with a Paperclip | | | Thu, 8:30 AM |
| Sent | ☐ Maker Faire | Maker Faire Bay Area 2013 - Come See the Maker Movement's Mover... | | | Wed, 12:24 PM |
| Spam (8) | ☐ Foursquare | Need inspiration for a Memorial Day trip? We've got all the must-see pl... | | | Tue, 3:23 PM |
| Trash (6) | ☐ ○ Marriott Rewards | ≫ 4 Consolidated emails (promotions) ～604 | | | Apr 20 - Apr 27 |
| FOLDERS ────⊕ | ☐ Marriott Lodging Customer Re... | Your recent stay at Marriott | | | Mon, 10:14 AM |
| Friends | ☐ ThinkGeek Overlords | ThinkGeek's riddle: $10, $20, $30 off | | | Mon, 8:49 AM |
| Reciepts | ☐ Instructables | ≫ 6 Consolidated emails (news, promotions) ～606 | | | Apr 20 - Apr 27 |
| Shuttles | ☐ Marriott Rewards | Welcome to Marriott Rewards | | | Sat, 1:23 PM |
| TwitchTV (6) | ☐ Twitch | ≫ 6 Consolidated emails (promotions) ～608 | | | Apr 19 - Apr 26 |
| Unsubscribe | ☐ ThinkGeek Overlords | ThinkGeek's Finn - sized sword | | | Apr 26 |
| MESSENGER | ☐ Ⓨ Yahoo! | Watch the Burning Love season finale today | | | Apr 26 |
| Me: ⁄\ Offline ▾ | ☐ Twitch | ≫ 4 Consolidated emails (announcements) ～610 | | | Apr 18 - Apr 25 |
| Sign in to Messenger to see who's online. | ☐ Instructables | Power Over Ethernet, Taste - Changing Candy, Stovetop Temperature C... | | | Apr 25 |
| APPLICATIONS ───✱ | | | | | |
| Report bug | | | | | |

602 → Inbox (1)
600 (screen)

FIG. 6

| YAHOO! MAIL | | | 800 | Hi, Tom |
|---|---|---|---|---|
| INBOX CONTACTS CALENDAR | | Search Mail  Search Web | ↙ | ⚙ 🏠 |
| ✚ New Contact | 🔍 Look for... | 504 ↙ | | 532 ↘ |
| All Contacts | ⚙ Actions ▾  👥 Import Contacts ↘ | | | |
| All Senders | ☐ ▾ SORT BY FREQUENCY | FREQUENCY | | TOTAL |
| SHORTCUTS | ☐ HP Enterprise Security | 5-7 per day | ᴡᴡᴡ | 19,234 🗑 |
| Deleted Contacts | ☐ ThinkGeek Overlords | 2 per day | ᴧᴧ ← 804 | 18,213 🗑 |
| Facebook | ☐ Twitch | 4 Consolidated | ᴧ | 17,234 🗑 |
| LISTS ───── ✚ | ☐ IntoNow | 5 Consolidated | ᴡᴡᴡ | 16,213 🗑 |
| | ☐ ⓨ! Instructables | 5 per day | ᴡᴡᴡ | 14,234 🗑 |
| | ☐ Instructables | 4 per day | ᴡᴡᴡ | 12,213 🗑 |
| | ☐ iBookstore | 5 per day | ᴡᴡᴡ | 11,234 🗑 |
| | ☐ Wikipedia | 4-6 per day | ᴡᴡᴡ | 11,213 🗑 |
| | ☐ Instructables | 1-2 per day | ᴧ | 10,234 🗑 |
| | ☐ iTunes | 2 Consolidated | ᴧ | 10,213 🗑 |
| | ☐ Jim Messina, BaarckObama.com | 2-4 per week | ᴧᴧ | 9,234 🗑 |
| | ☐ Twitter | Blocked | ᴧᴧ | 9,213 🗑 |
| | ☐ Marriott Rewards | 2 per day | ᴧᴧ | 8,234 🗑 |
| | ☐ iBookstore | 3-5 per week | ᴧᴧᴧ ← 806 | 7,213 🗑 |
| | ☐ Joe Biden | 1 per day | ᴧ | 6,234 🗑 |
| | ☐ Mac App Store | Blocked | ᴡᴡ | 5,213 🗑 |
| | ☐ Schwab Education | 5-6 per day | ᴡᴡ | 4,234 🗑 |
| | ☐ PUMA | 4 per week | ᴡᴡ | 4,213 🗑 |
| | ☐ Dan Gross, Brady Campaign to... | 1-3 per week | ᴧ | 3,234 🗑 |

FIG. 8

COMPUTERIZED SYSTEMS AND METHODS FOR A MESSAGE FREQUENCY AND CONTROL ASSISTANT

This patent application claims the benefit of and is a continuation of U.S. patent application Ser. No. 16,154,849, filed Oct. 9, 2018, which is a continuation of U.S. patent application Ser. No. 14/045,561, filed Oct. 3, 2013, now U.S. Pat. No. 10,110,532, which are incorporated by reference herein in their entirety.

BACKGROUND

The evolution of the Internet and developments in mobile computing have made available many communication modalities to the users. Email communications have gained popularity for personal and business communications. In the business arena, email systems are extensively used not only to exchange documents, but also for advertising products and services to consumers. With their speeds, ease in simultaneous communication with large volume of clients and in facilitating generation of instantaneous business, advertisements through email systems provide great advantages when compared to traditional print and media advertisements. This has resulted in email users receiving large volume of email from many senders.

SUMMARY

This disclosure relates to systems and methods for enabling a user to detect senders who transmit email messages frequently and take appropriate actions. A method for consolidating emails from a sender is disclosed in accordance with one embodiment. The method comprises receiving, by a processor, input from a user of an email account to consolidate emails received at the email account from a sender. A view of an inbox of the email account is configured by the processor, such that, a consolidated view of emails from the sender is shown to the user when a first new email from the sender upon the user consolidating emails for the sender. The consolidated view comprises a first indication associated with a prior email from the sender already existing in the inbox which is also used for indicating the first new email. A user device displays the consolidated view of the first new email and the existing email when the user logs into the email account. In an embodiment, a consolidation element is included in a display of the inbox such that the input from the user is received via activation of the consolidation element. In addition, consolidation criteria, such as, a time period for consolidating emails, are received for the sender by the processor. In an embodiment, when a second new email is received from the sender upon detection of the expiry of the time period, the view of the inbox is configured to show a second indication for the second new mail. In an embodiment, the emails in the consolidated view are configured by the processor, to be displayed in a tabbed user interface when the user desires to view the emails.

In an embodiment, attributes of different senders transmitting email messages, such as but not limited to, a type of emails transmitting to the email account and a frequency of message transmission associated with each sender are detected. The processor is configured to generate a user interface associated with the email account to display statistics associated with most frequent senders based on the detected attributes.

A computing device comprising a processor and a storage medium for tangibly storing thereon program logic for execution by the processor is disclosed in an embodiment. The program logic comprises input receiving logic for receiving input from a user of an email account to consolidate emails received at the email account from a sender, email receiving logic for receiving a first new email from the sender and inbox configuring logic for configuring a view of an inbox of the email account to show a consolidated view of emails from the sender wherein a first indication associated with a prior email from the sender already existing in the inbox is also used for indicating the first new email and transmitting logic for transmitting instructions to a user device to display the consolidated view of the first new email and the existing email when the user logs into the email account.

In an embodiment, the program logic further comprises configuring logic, executed by the processor, for configuring a display of the inbox to include a consolidation element such that the receiving logic, executed by the processor, receives the input from the user via activation of the consolidation element. Criteria receiving logic, is executed by the processor, for receiving consolidation criteria for the sender wherein the consolidation criteria comprise at least a time period for consolidating emails from the sender. The processor also executes detecting logic for detecting expiry of the time period and entry configuring logic for configuring the view of the inbox to show a second indication for a second new mail received from the sender upon the expiry.

A computer readable storage medium comprising processor-executable instructions is disclosed in an embodiment. The instructions when executed by the processor cause the processor to receive input from a user of an email account to consolidate emails received at the email account from a sender such that when a first new email is received from the sender by the processor, a view of an inbox of the email account is configured to show a consolidated view of emails from the sender. The consolidated view includes a first indication associated with a prior email from the sender already existing in the inbox which is also used for indicating receipt of the first new email. Thus, the first new email does not result in a new entry in the inbox. The instructions cause the processor to transmit to a user device, instructions to display the consolidated view of the first new email and the existing email when the user logs into the email account. The computer readable storage medium further comprises instructions to provide a consolidation element in a display of the inbox and receive an activation of the consolidation element as the input from the user. Further instructions comprised within the computer readable storage medium include instructions to receive consolidation criteria for the sender, wherein the consolidation criteria comprise at least a time period for consolidating emails from the sender.

In an embodiment, the computer readable medium further comprises instructions to detect expiry of the time period so that when a second new email is received from the sender upon the expiry, the view of the inbox is configured to show a second indication for the second new mail wherein the second indication is disparate from the first indication.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views:

FIG. 6 illustrates a schematic diagram of an inbox showing messages received from senders from whom email messages are merged or consolidated in accordance with one embodiment;

FIG. 8 shows a schematic diagram of the senders tab in the user's email account in accordance with one embodiment;

DESCRIPTION OF EMBODIMENTS

Figure 1:
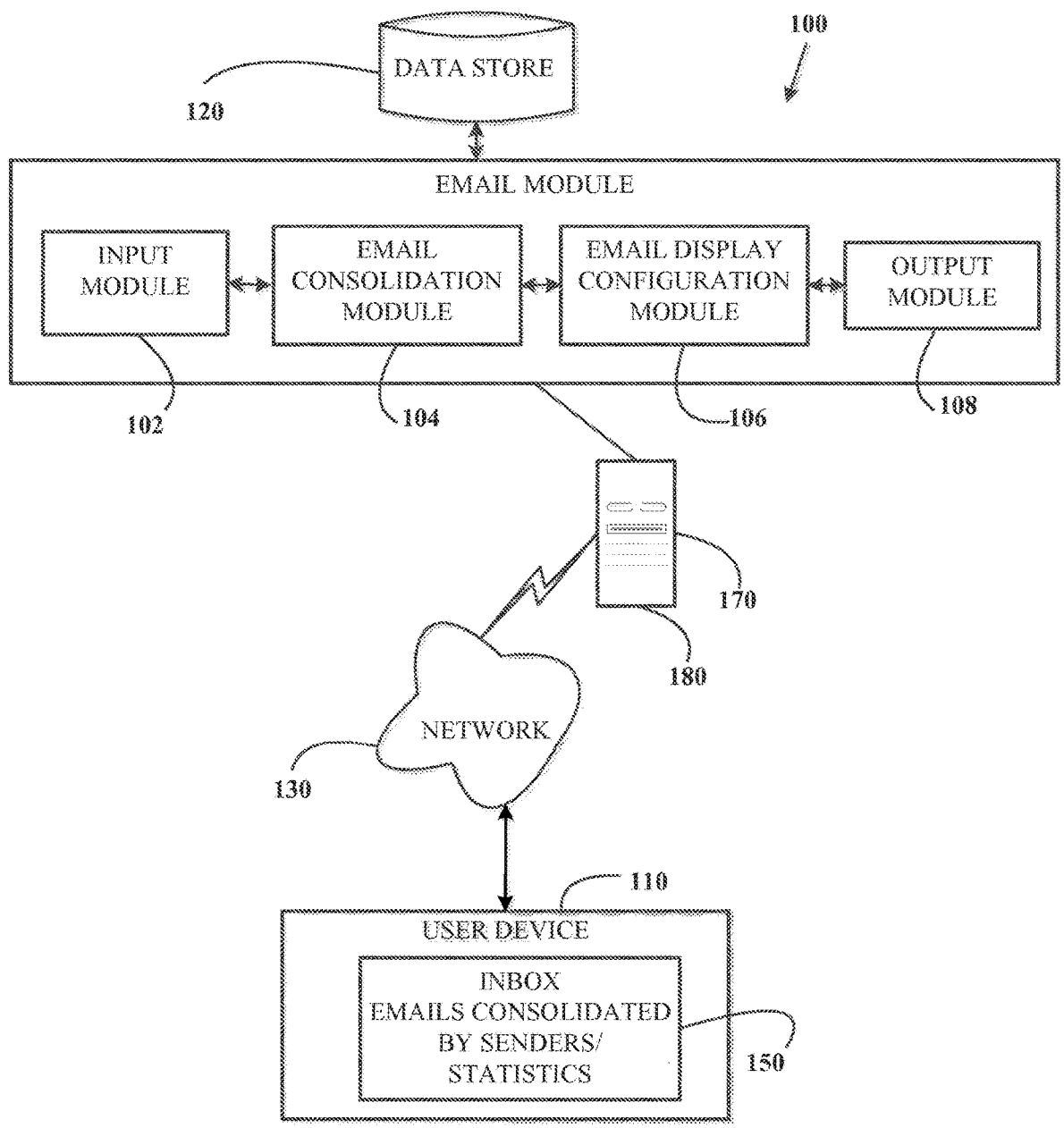
FIG. 1 shows a schematic diagram of a system that enables consolidation and classification of emails in accordance with an embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The Internet is an essential medium for communication so that people all over the world have their own email accounts to receive electronic mail just as they have their own addresses to receive paper mail. As the email accounts are used through the years for personal and business communications, the entities sending communications to the email accounts add up and a point may be reached for many users when they receive hundreds of email communications daily in their email accounts. In many instances users may not have the time to examine each email message to determine which of the emails are useful or which are irrelevant to them. To save time, users generally tend to judge the importance or urgency of an email based on a sender and may promptly open or ignore email messages based on the senders' identities. For example, while an ad email from a retailer with a deal may not be opened promptly by the user, the deal may nevertheless be of interest to the user. But when the user's inbox is overflowing with new email from a multitude of senders, there is a high likelihood that the user may miss the interesting deal as the user neglects to open the email message. Hence, various embodiments are disclosed herein that provide better organization for email users' inboxes and helps them sift through their emails more efficiently.

Turning now to the figures, FIG. 1 shows a schematic diagram of a system 100 that aids users in better organizing their emails and thereby more efficiently identifying content of interest in their respective email accounts. An email server or an email module 170 is configured to facilitate electronic mail (or email) communications between various users via providing them with email accounts to receive and send email messages. A user device 110, such as but not limited to, a desktop, laptop or a smartphone can be employed by an email user to access his/her email account with the email module 170 via a network 130 such as but not limited to the Internet or a mobile data network. The email module 170 executes on a processor (not shown) of the machine 180 in conjunction with a data store 120. The data store 120 is employed for storing user info which includes user identification information, messages received for sent by the user and preferences of the user which, in one embodiment, is used for configuring various displays as will be detailed further herein. In an embodiment, the data store 120 can be part of the machine 180. In an embodiment, the data store 120 can be remote from the machine 180 executing the email module 170 and accessible to the machine 180 via a network such as, network 130.

In an embodiment, the email module 170 is configured to organize the user's email in a manner that aids the user in quickly reviewing the inbox and opening messages that are of greater or immediate interest to the user. An input module 102 of the email module 170 receives messages transmitted to the user by the various senders and communicates them to the email consolidation module 104. The email messages thus received are consolidated based on the senders and in accordance with the various consolidation criteria associated with the email account by the email consolidation module 104. In an embodiment, the email consolidation module 104 can also be configured to generate statistics for the various senders so that the user can receive a summary view of the frequency and types of messages transmitted by the various senders. The email display configuration module 106 configures a display of the user's inbox so that the various email messages received by the user are sorted on default criterion such as, the date, and further consolidated based on the sender's identification. The display configuration instructions are transmitted to the user device 110 via the output module 108 so that the display 150 of the inbox shown on the user device 110 is configured in accordance with instructions from the email display configuration module 106.

In an embodiment, the display configuration instructions can cause the user device 110 to display a merge entry or a merged message in the user's inbox by adding a received new message from a sender to an entry associated with a message that already exists in the user's inbox from the same sender. The appearance of the merged entry is changed to indicate receipt of the new message. The same indication or entry in the inbox that earlier represented the existing message is updated to indicate the additional new message and highlighted or otherwise altered in appearance to indicate to the user, receipt of a new message from the sender who sent the existing message. Therefore, the receipt of a new message does not create an additional entry in the inbox. Rather, it changes the appearance of an existing inbox entry and hence mitigates the need for the user to scroll through multiple entries for the same sender. In one embodiment, when the email user selects to view the consolidated entry, multiple messages associated with the entry can be simultaneously displayed, for example, under various tabs as will be detailed further herein.

In an embodiment, the consolidation of emails for the sender can be limited to a certain time period such as one week or one month as determined by the user. The user can determine the time period for consolidation based on, for example, volume of the mail received and/or level of interest of the user in the sender. The emails received from the sender are consolidated during the time period to a single indication or merged entry. In an embodiment, in addition to a count of the messages associated therewith, the merged entry can also be associated with a flag within the database. The value of the flag is indicative of the status of the time period. The flag can be set to different values based on whether the current time period is within the time limits set by the user or if the time limit has expired since the message was last updated. Upon the expiry of the time period, the consolidation to the single merged entry is halted based on the flag value and a second new entry or new indication with the count reset to one can be in included in the inbox for the first new email message received thereafter from the sender thus beginning a new cycle. Subsequent messages received from the sender are added to the count and accessed via the second new entry until the expiration of the time period for the second time and a third new entry may be started. Thus, upon expiry of a given time period associated with a sender, the consolidation to an inbox entry for the sender is halted and a new entry is commenced.

In an embodiment, the email consolidation module 104 is also configured to generate, in response to a request from the user, statistics for the various senders who transmit email messages to the user's email account. The email display configuration module 106 accordingly transmits instructions via the output module 108 for a display 150 of the user device 110 to show the sender statistics. These statistics aid the user in determining which senders are sending email most frequently to the inbox in addition to the nature/type of the messages received at the user's inbox. This can facilitate the user to classify certain senders who send messages too frequently as spammers thereby blocking their messages and increasing the capacity of the inbox to receive more useful email.

Figure 2:
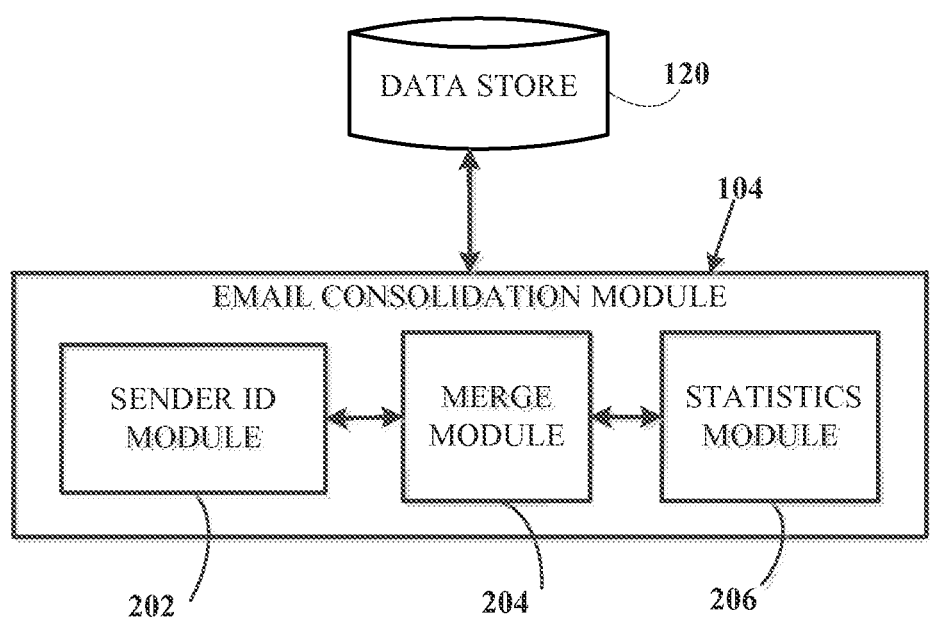
FIG. 2 is a schematic diagram of the email consolidation component in accordance with one embodiment.

FIG. 2 is a schematic diagram of the email consolidation module 104 in accordance with one embodiment. The email consolidation module 104 further comprises a sender id module 202, a merge module 204 and a statistics module 206. When a new message is received it is analyzed to identify the sender by the sender id module 202. As described herein, a user of an email account can select to consolidate all the emails received from a sender for a particular time period. The consolidation can occur regardless of the email subject line or the type of email. Only one indication is entered in the user's inbox for all the emails received from the sender during the consolidation time period. Accordingly, if the user of the email account elects to consolidate emails from the sender, the temporal criterion for the consolidation needs to be input by the user. The sender id module 202 can be configured to access such criterion, for example from the data store 120, in order to determine if an indication/inbox entry for the new email should be merged with an existing entry or if a new entry should be initiated. In an embodiment, a default value, such as, a week, can be associated with senders for consolidation of emails if the user provides no specific time criterion. If no consolidation input is detected or if the time period is reset for the sender, a new mail entry may be entered in the user's inbox. In an embodiment, the user's inbox can be configured to provide elements that enable a user to request consolidation of emails associated with each of the different senders. If email consolidation has been requested by the user for the sender of the new email message and a consolidation time period is currently running for the sender, the merge module 204 determines if there exists a message entry for the sender in the user's inbox. If a message entry for the sender exists in the user's inbox, the existing message entry is updated to indicate receipt of the newly received email message and to provide access to the newly received message. For example, when the user selects the merged entry on the user device 110, the merged entry is configured to display all the messages associated with the entry, for example, under the various tabs.

In an embodiment, different instances for email messages received from the sender within the consolidation time period can be associated with a corresponding merged message, for example, via setting a property value. Correspondingly, whenever a new email message is received, a merged message can be identified and updated to be associated with the new email message. In an embodiment, a count property can be associated with an instance of the merged message such that count is updated for each newly received message that is associated with that instance of the merged message. In an embodiment, the appearance of an inbox entry associated with the merged message can also be updated. For example, the inbox entry can be bolded or otherwise emphasized to indicate receipt of a new message from the sender. If there is no current message entry for the sender in the user's inbox, the message id module 204 generates a new instance of a merge message and associates the new instance with the newly received message. The message count of the new instance of the merged message is set to one for indicating receipt of a new message from the sender. The user's inbox can be configured to display a corresponding new entry for the newly instanced merge message. As the user elected to consolidate email messages from the sender, any subsequently received messages are similarly processed and indicated to the user via the new entry until the expiration of the time period.

The statistics module 206 is employed for generating statistics for the various message senders transmitting email to the user's email account. By the way of illustration the statistics can include but are not limited to the frequency of messages transmitted by the senders, the types of messages, percentage of messages received by the user that are transmitted by a sender or message senders who are transmitting particular types of email messages. The statistics can convey the requested information via various graphical or pictorial representations that can be easily read or interpreted by the user.

Figure 3:
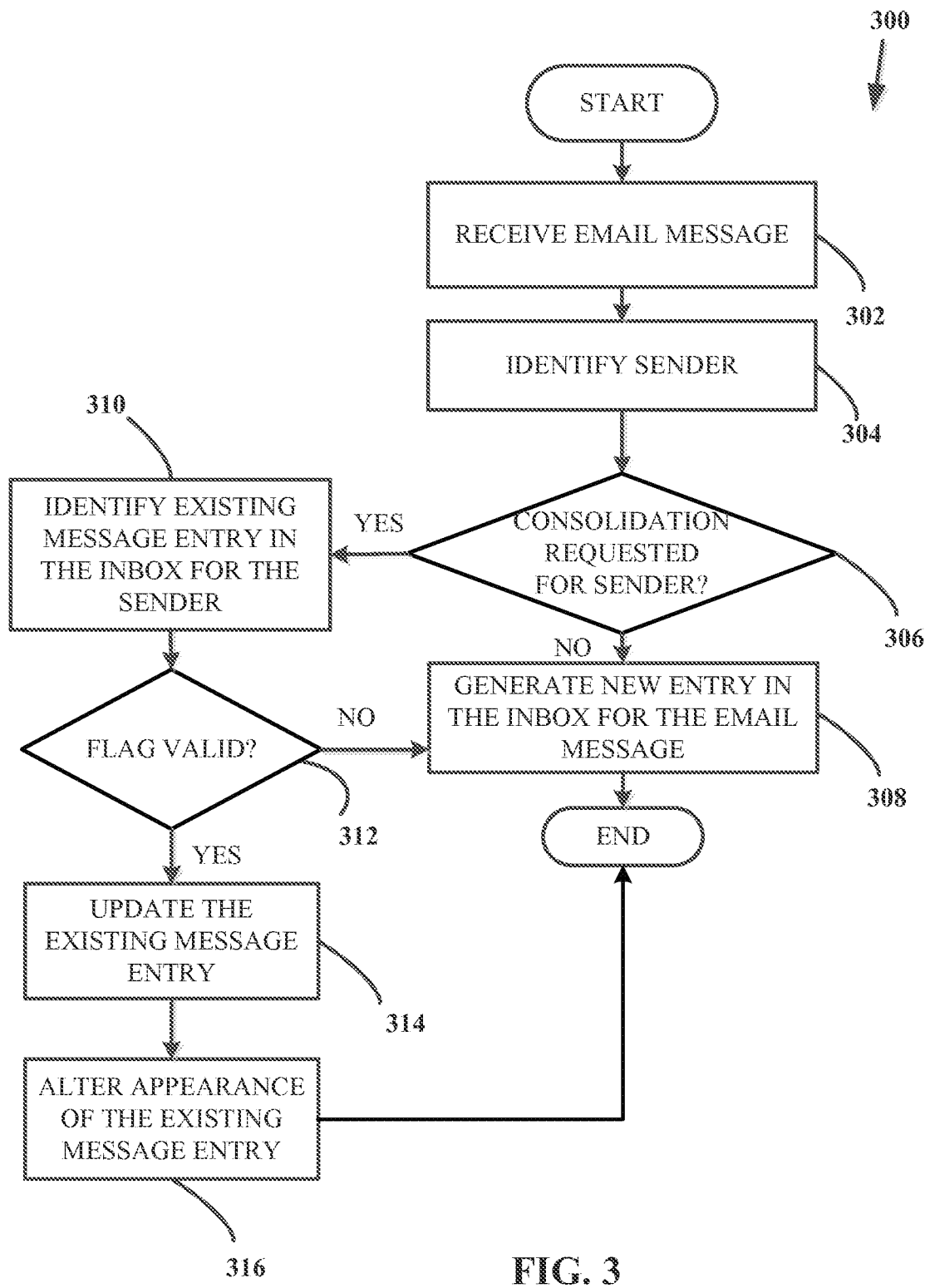
FIG. 3 illustrates a method of providing consolidation of messages for email users in accordance with one embodiment.

FIG. 3 illustrates a flow chart 300 for a method of providing consolidation of messages for email users in accordance with one embodiment. The method commences with receipt of a new message from a sender at an email account at 302. At 304 the sender of the message is determined and at 306 it is determined if the user has requested consolidation of the messages from the sender. If the user has not requested message consolidation for the sender, then a new message entry is generated in the inbox at 308 and the process terminates on the end block. If at 306 it is determined that the user has requested message consolidation for the sender, an existing message entry in the inbox is identified for the sender at 310 and a flag associated with the message entry is examined at 312. As described supra, the flag value can be associated with an internal clock of a processor executing the method and can vary based on the time period that the user has set for consolidation. Thus, the flag can be valid until the clock runs through the time period set by the user and may become invalid upon expiry of the time period. Thus, if it is determined at 312 that the flag is invalid, the time period for consolidation has expired and accordingly a new message entry is included in the inbox as shown at 308.

If it is determined at 312 that the flag is valid, the time period for consolidation to the existing message entry is still running. Accordingly, the existing entry is updated as shown at 314 to be merged with the new message as described supra such that a single entry in the user's inbox associated with the merged message provides access to the existing message and the newly received message. Furthermore, an updated count for the new message is included in the merged message. In an embodiment, the user can access all the messages associated with the merged message entry by clicking on or otherwise selecting it. The appearance of the merged message entry is altered at 316 to indicate receipt of the new message to the user.

Figure 4:
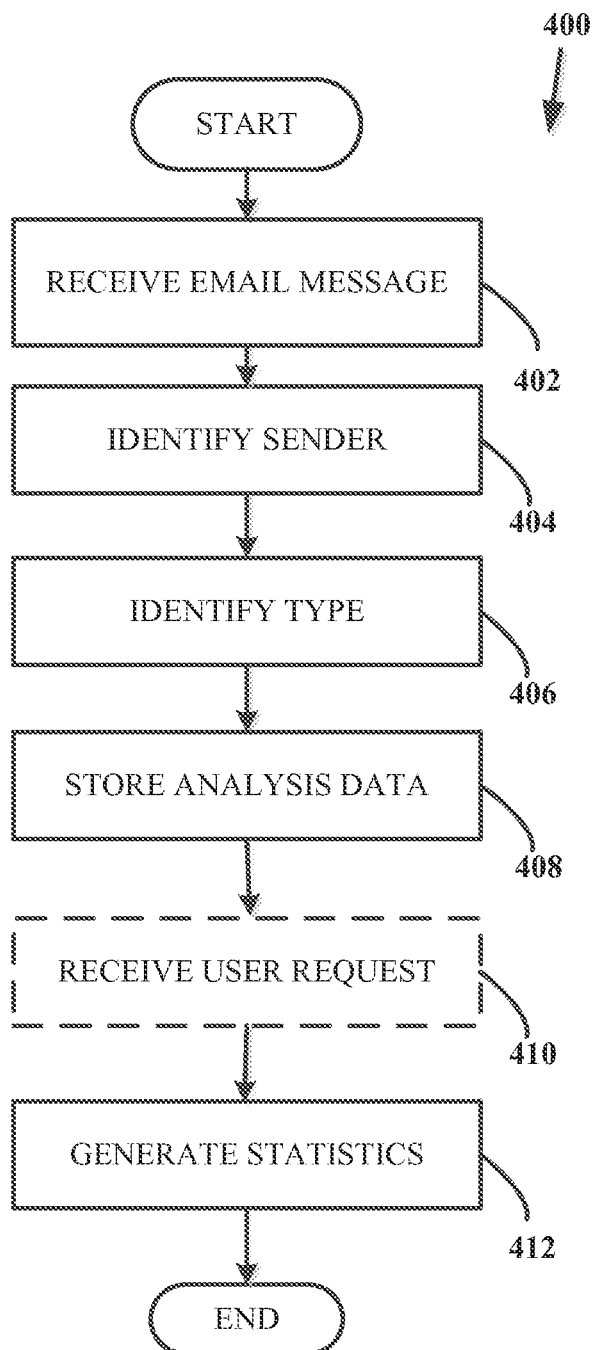
FIG. 4 illustrates a method of providing information regarding senders to a user of an email account in accordance with one embodiment.

FIG. 4 illustrates a flow chart for a method of providing information regarding senders to a user of an email account. The method begins at 402 with the email account receiving a new message from a sender. At 404, the sender of the email message is identified. The type of email message received from the sender is also identified at 406. In an embodiment, the sender can be an individual and the type of message can be a personal message. In an embodiment, the sender can be a business entity and the type of message can be an advertisement, a promotion or a message related to a transaction such as confirmation of order or payment receipt or shipping notification. In an embodiment, the type of message can be determined based on the subject line of the message or by further analysis of the content in the body of the email by the email module 170. In an embodiment, the data associated with the type of messages received by the user from the sender can be stored in a database at 408 for further analysis. In an embodiment, a user request for analysis of an email account such as, across various senders or messages is received at 410. It may be appreciated that the step of receiving a user request is not necessary or is optional to generate and provide the statistics. In an embodiment, the email module 170 can be configured to generate and provide message/sender related statistics without any input or request from the user. Accordingly, at 412 various statistics per the user request are generated by the email module 170 and provided for display to the user on the user device 110.

Figure 5:
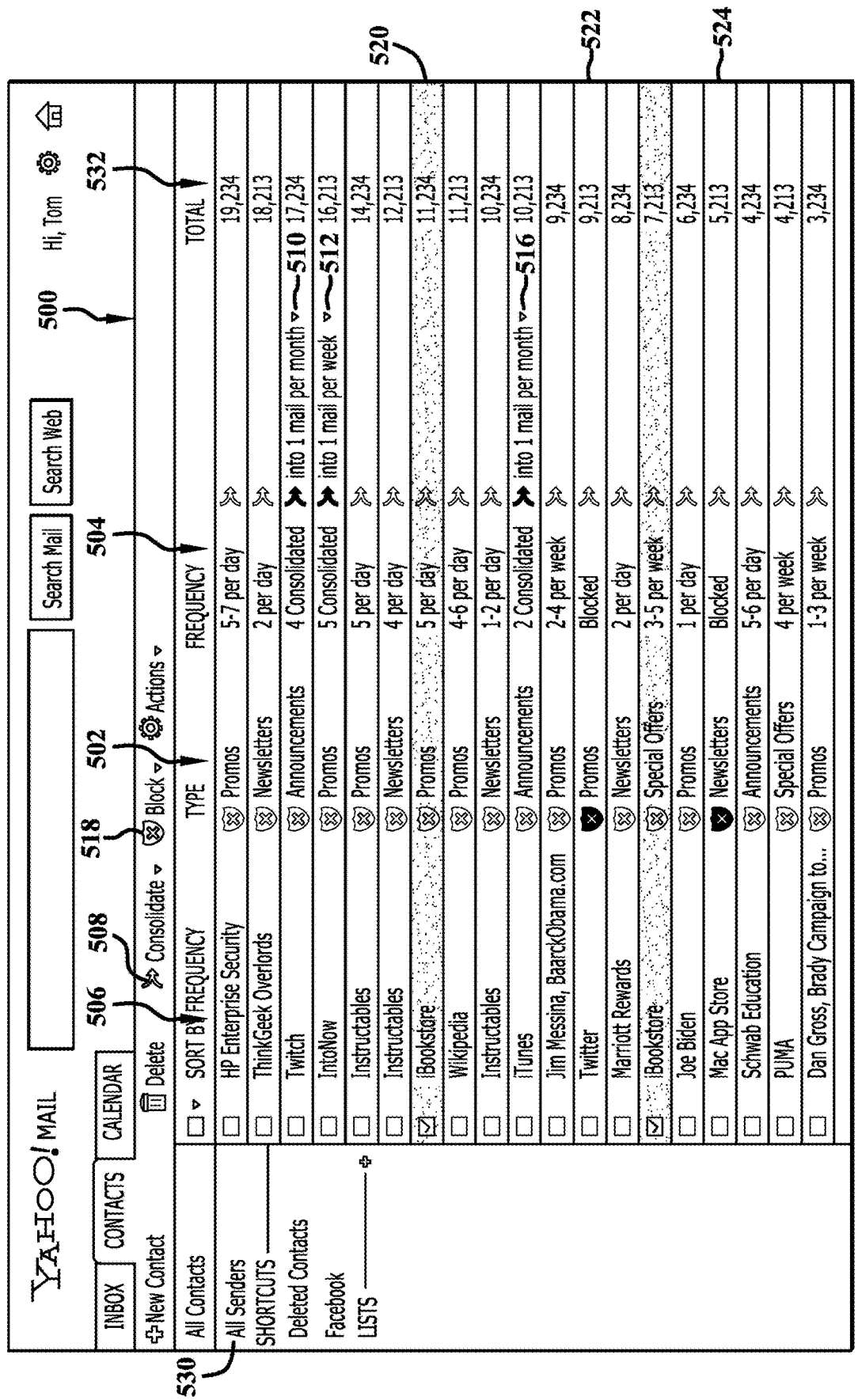
FIG. 5 illustrates a schematic diagram of a contacts tab associated with a user's email account in accordance with one embodiment.

FIG. 5 illustrates a schematic diagram of a contacts tab 500 associated with a user's email account. The contacts tab 500 is configured to enable user request for consolidation of emails from different senders in accordance with embodiments described herein. In an embodiment the user's contacts tab 500 can also be configured to include the 'all senders' tab 530 comprising fields such as type of email 502, the frequency of email 504 received from the sender, the total number of emails received from the sender 532 and a user interface element 506 to sort the senders based on the frequency with which they send the emails to the user's email account. This enables the user to determine whether or not to consolidate emails from the sender and if consolidated, the criteria such as the time period to be associated with the email consolidation for each sender. The user consolidates senders Twitch 510 and Jim Messina 516 into one email per month and the sender IntoNow 512 is consolidated into one email per week. Thus, all the emails received from senders at 510 are consolidated into one email such that only one entry is shown in the user's inbox up to a month. Whenever a new mail is received from Twitch 510, the entry can be changed in appearance in order to convey the receipt of a new email message to the user. Similar procedure can be implemented to consolidate senders at 512 and 516. A user interface element for consolidation 508 enables to user to consolidate emails from the sender. It may be appreciated that the placement of user interface elements within the contacts tab 500 is shown only by the way of illustration and not limitation and that other locations within the inbox 500 can be contemplated for placing the user interface elements in accordance with embodiments described herein. In an embodiment, the user can select a message from a sender and click on the consolidation element 508 in order to consolidate emails from the selected sender. Similarly, a user interface element 518 to block a particular sender can also be included in the contacts tab 500. For example, the user has chosen to block senders at 520, 522 and 524 so that their emails are not shown in the inbox 500.

FIG. 6 illustrates a schematic diagram of an inbox 600 showing messages received from senders from whom email messages are merged or consolidated in accordance with one embodiment. Various senders are consolidated by the user such that a respective merged message at 604, 606, 608 and 610 is displayed for multiple emails received from the consolidated senders. The notification 602 indicates that the user has received a new message and the inbox entry at 604 indicates that a new message is received from a consolidated sender, Marriott Rewards. As seen from FIG. 6, the new message is not displayed as another entry in the inbox 600, rather, the appearance of the consolidated merged message at 604 is altered to indicate receipt of a new email. In addition to the number of email messages in the merged message, the type(s) of messages which are merged are also indicated. For example, the merged message at 606 comprises of both promotions and news type of messages. In an embodiment, the user can customize the inbox 600 to show different merged message entries for different types of email messages.

Figure 7:
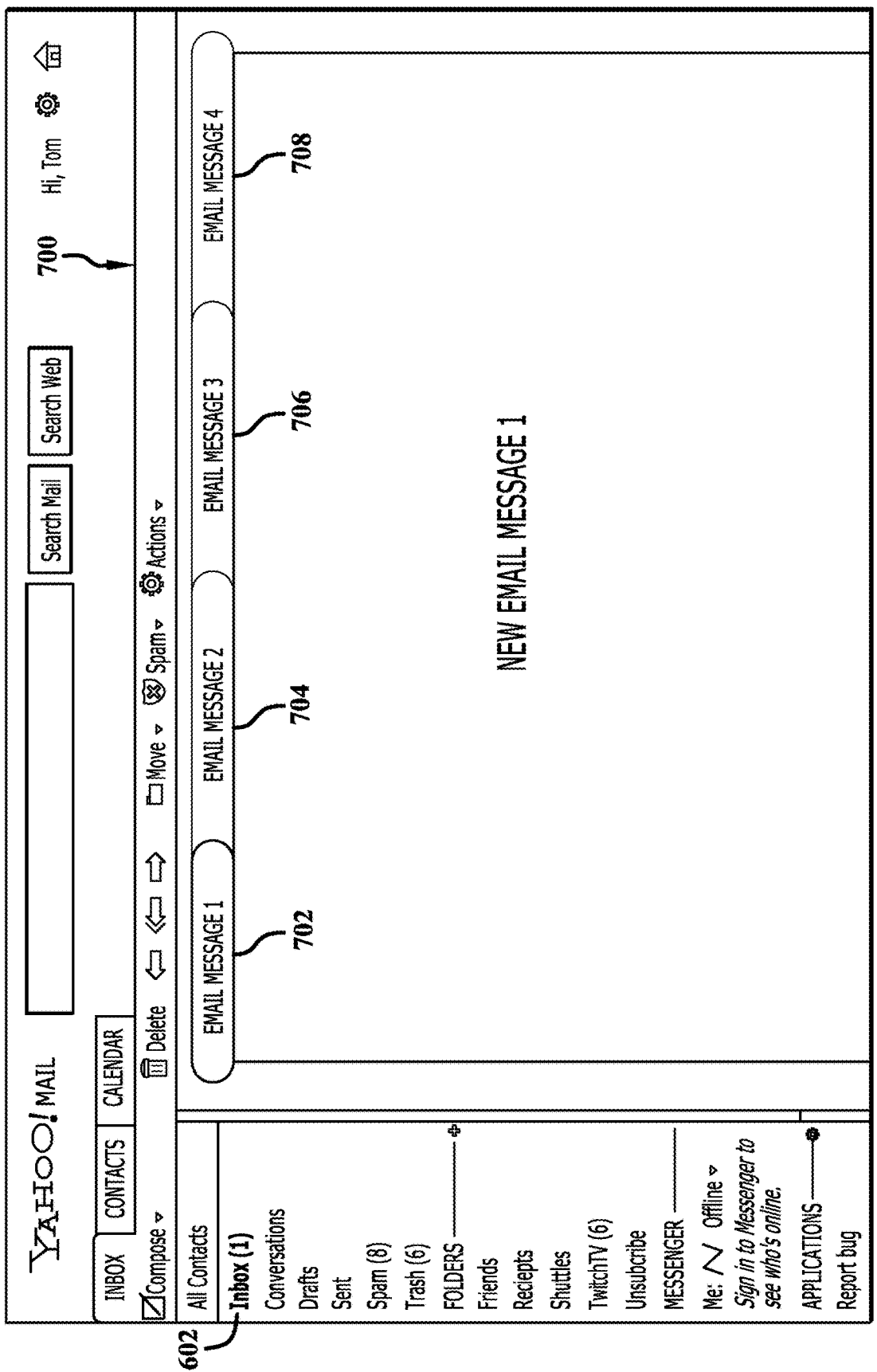
FIG. 7 illustrates a schematic diagram of a view generated when the user selects the merged message from the inbox in accordance with one embodiment.

FIG. 7 illustrates a schematic diagram of a view 700 generated when the user selects the merged message 604 from the inbox 600. As seen from FIG. 6, the merged message 604 comprises four messages, one or more of which can be new messages. When the user clicks on the merged entry 604, the four messages associated with the merged entry 604 can be displayed within a respective tab 702, 704, 706 and 708. In FIG. 7, the new email message is displayed under tab 702 while the remaining messages are displayed in the remaining tabs. It may be appreciated that the order of the tabs is not limiting and that the various messages can be displayed under respective tabs arranged in a different order.

FIG. 8 shows a schematic diagram 800 of the senders tab in the user's email account in accordance with one embodiment. The frequency field 506 that indicates the frequency with which a particular sender sends emails to the user's email account while the total field 532 indicates the total number of messages received by the user's email account from each sender. A graph 804 shows that two emails received from a particular sender each day. Another graph 806 which shows some peaks in a lighter shade indicates that 3-5 emails are received from another sender, iBookstore, each week. Thus, the various graphs can be generated for example, by the sender statistics module 206 showing the number of emails received in a given time period. This facilitates the user to determine whether to consolidate emails from a sender and other criteria such as the time period for the consolidation. In an embodiment, the email module 170 can automatically assign the time period for consolidation based on the frequency related to the sender as described herein. For example, for the sender ThinkGeek-Overlords, a default time period one day can be assigned for consolidation whereas for the sender iBookstore, a default time period of one week can be assigned for consolidating the email messages.

Figure 9:
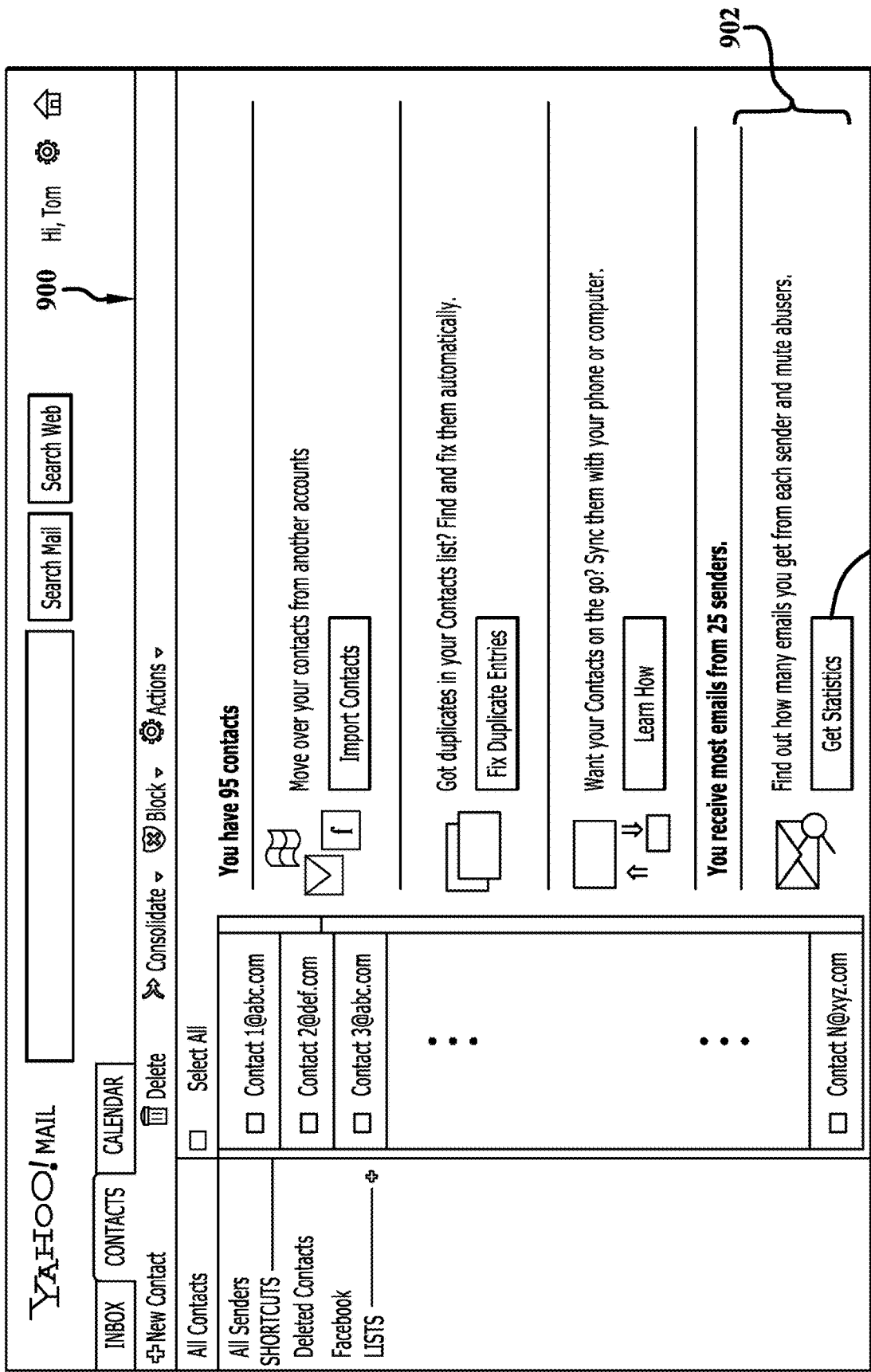
FIG. 9 illustrates a view of the contacts tab in accordance with one embodiment.

FIG. 9 illustrates another view 900 of the contacts tab 500 in accordance with one embodiment. In the view 900, the contacts tab 500 comprises a new section 902 indicating the most frequent senders thereby enabling the user to identify potential spammers. The section 902 includes a get statistics button 904 which enables the user to request statistics regarding the messages received from the various senders.

Figure 10:
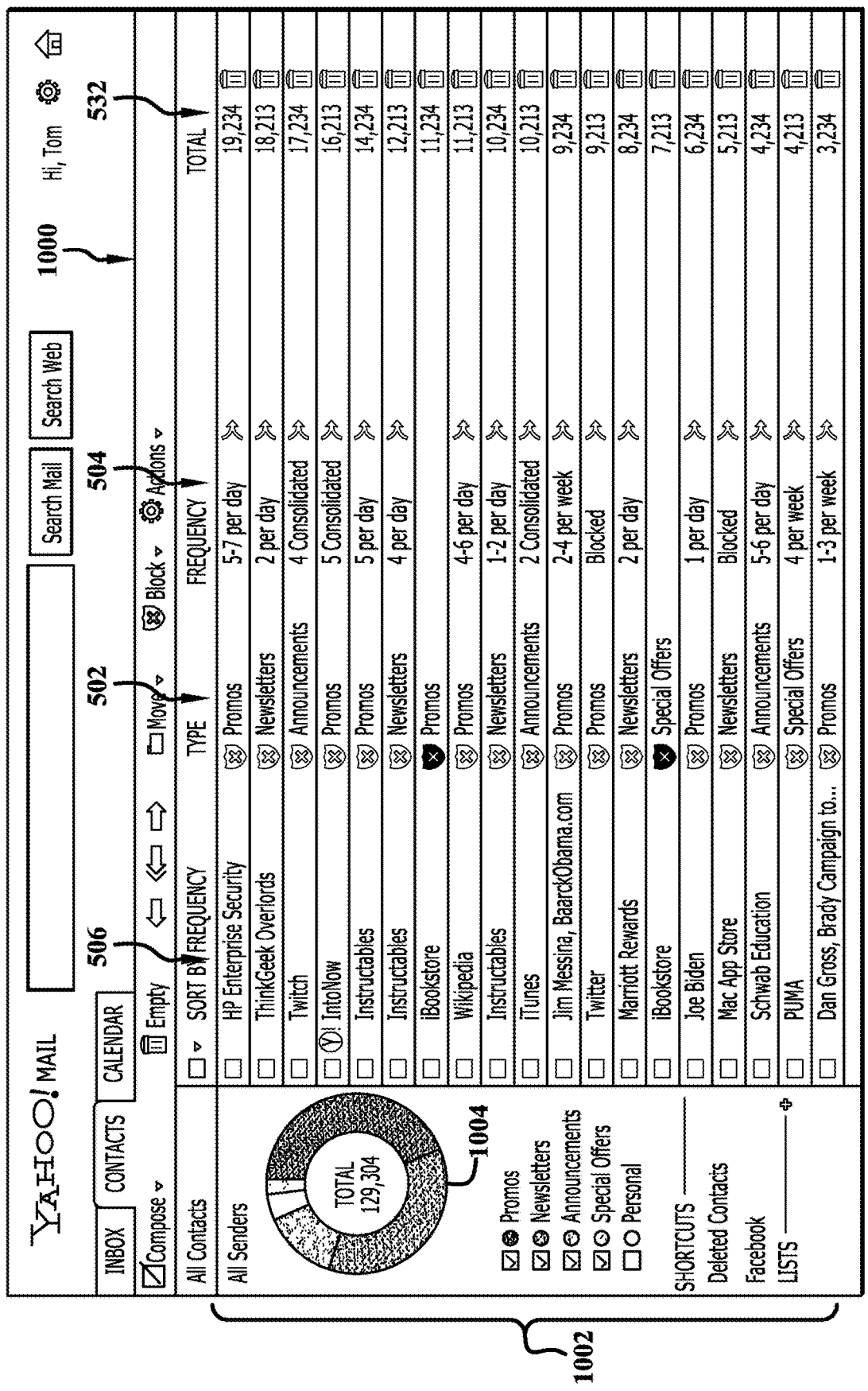
FIG. 10 shows a schematic illustration that is generated for all the emails received from the various senders in accordance with one embodiment.

FIG. 10 shows a schematic illustration 1000 that is generated for all the emails received from the various senders in accordance with one embodiment when the user clicks the get statistics button 904 included in the contacts tab. In addition to the fields such as type 502, frequency 504 and a sender column sorted by frequency 506, the view 1000 also comprises another section 1002 showing a graphical representation 1004 of the various types of emails received from the various senders. In FIG. 10, the user has selected to view statistics related to promos, announcements, newsletters and special offer types of emails. However, the user has not selected to view personal emails. Graphical representation 1004 shows the number of emails of each type as a part of the total number of emails received at the email account by all the senders. It may be appreciated that the graphical representation 1004 is shown only by the way of illustration and not limitation and that any other form of graphical representations such as a bar graph, a line graph or other forms can be used to convey the data associated with the type of email messages.

Figure 11:
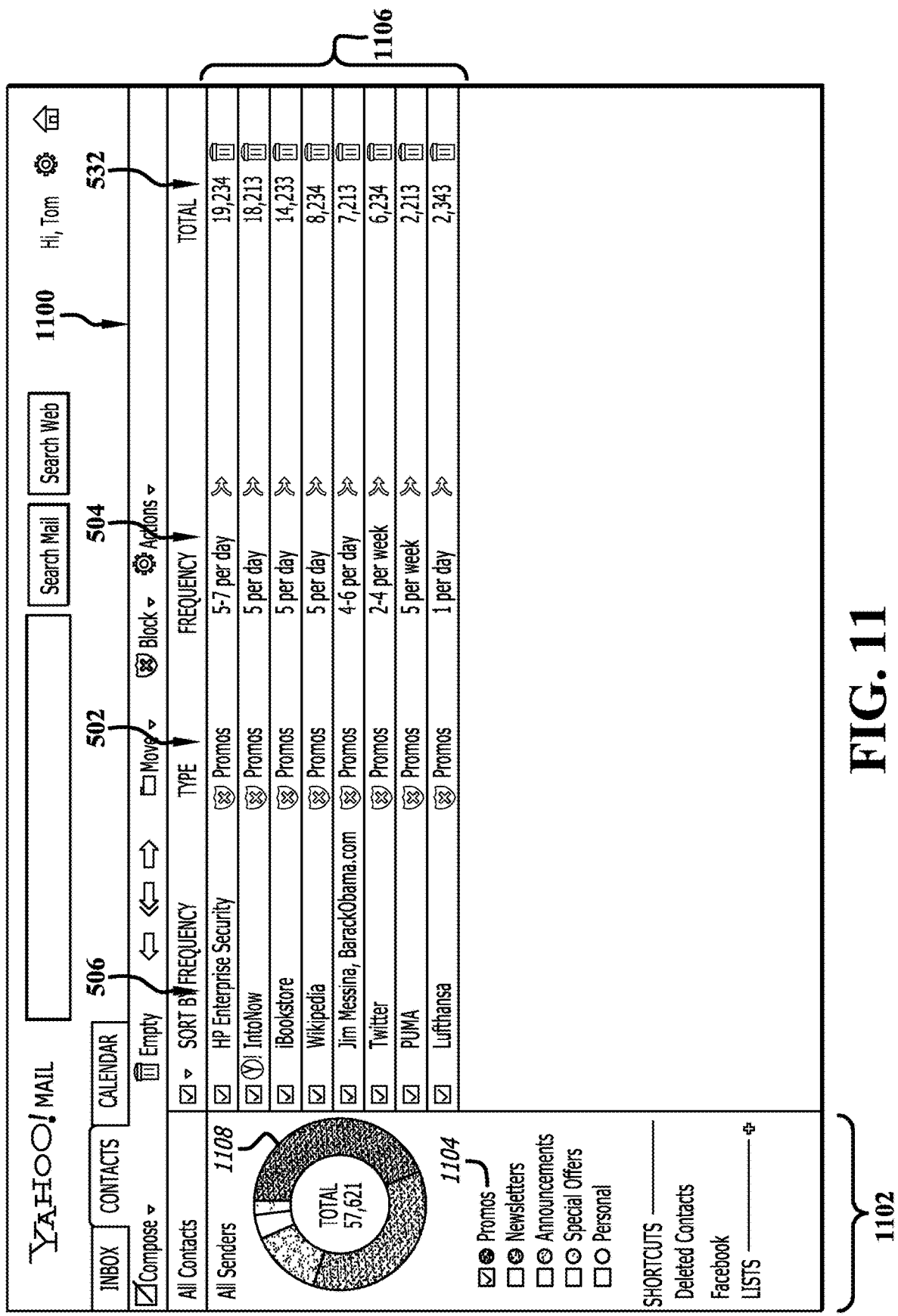
FIG. 11 shows a schematic illustration that is generated when the user selects to view statistics related to a particular type of email messages in accordance with one embodiment.

FIG. 11 shows a schematic illustration 1100 that is generated when the user selects to view statistics related to a particular type of email messages in accordance with one embodiment. In FIG. 11, the user selected to view statistics related to promotion type of emails 1104 received from various senders. A graphical representation 1108 shows the promo type of emails received by the user as a part of all the emails received at the email account. A separate section 1106 shows the details such as type 2 frequency 504, sender information 506 and total number of the promo type of emails 532 received by the user. Again, it may be appreciated that graphical representation 1108 is shown only by the way of illustration and not limitation and that any other form of graphical representations such as a bar graph, a line graph or other forms can be generated to convey the requested data.

Figure 12:
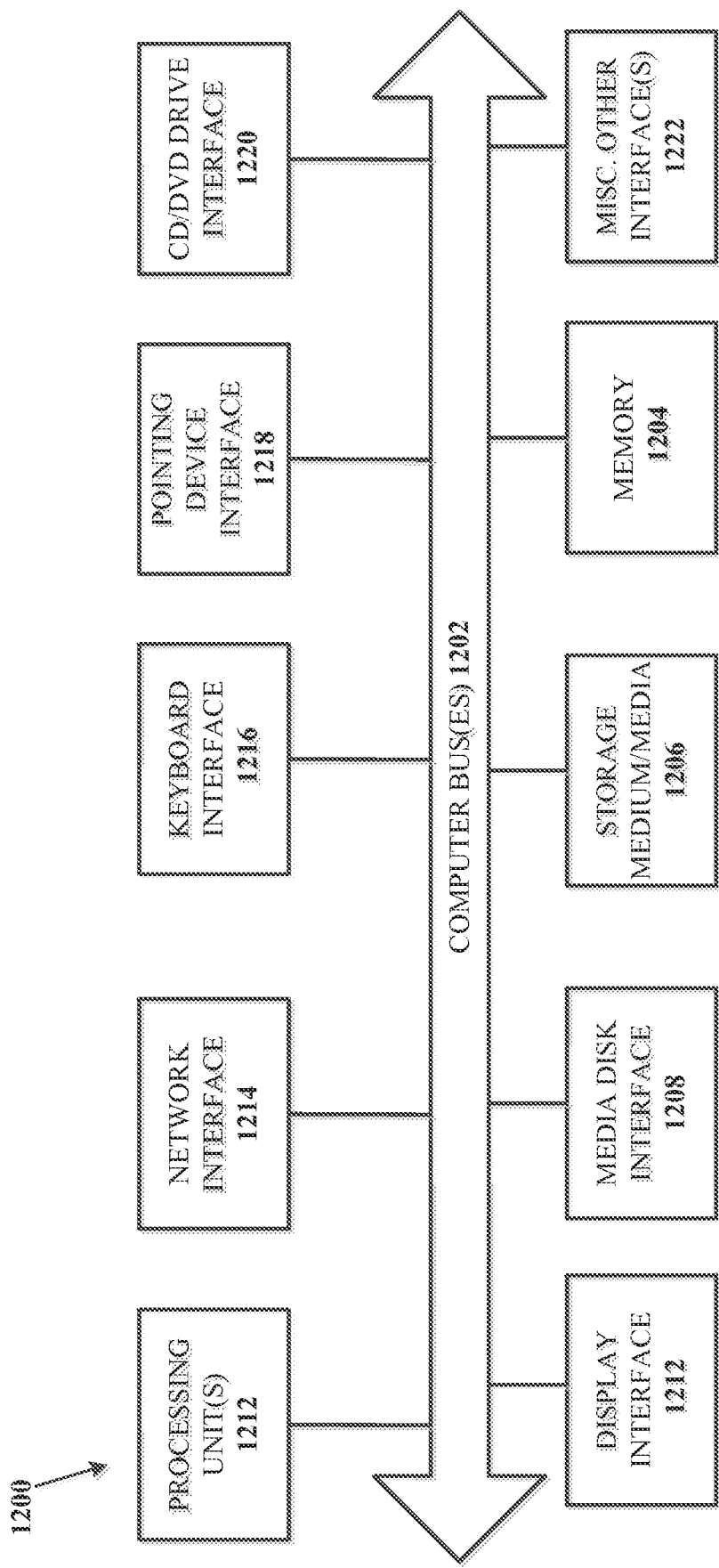
FIG. 12 illustrates internal architecture of a computing device in accordance with embodiments described herein.

As shown in the example of FIG. 12, internal architecture of a computing device 1200 includes one or more processing units (also referred to herein as CPUs) 1212, which interface with at least one computer bus 1202. Also interfacing with computer bus 1202 are persistent storage medium/media 1206, network interface 1214, memory 1204, e.g., random access memory (RAM), run-time transient memory, read only memory (ROM), etc., media disk drive interface 1208, an interface 1220 for a drive that can read and/or write to media including removable media such as floppy, CD-ROM, DVD, etc., media, display interface 1210 as interface for a monitor or other display device, keyboard interface 1216 as interface for a keyboard, pointing device interface 1218 as an interface for a mouse or other pointing device, and miscellaneous other interfaces 1222 not shown individually, such as parallel and serial port interfaces, a universal serial bus (USB) interface, and the like.

Memory 1204 interfaces with computer bus 1202 so as to provide information stored in memory 1204 to CPU 1212 during execution of software programs such as an operating system, application programs, device drivers, and software modules that comprise program code or logic, and/or computer-executable process steps, incorporating functionality described herein, e.g., one or more of process flows described herein. CPU 1212 first loads computer-executable process steps or logic from storage, e.g., memory 1204, storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage medium/media 1206 is a computer readable storage medium(s) that can be used to store software and data, e.g., an operating system and one or more application programs. Persistent storage medium/media 1206 can also be used to store device drivers, such as one or more of a digital camera driver, monitor driver, printer driver, scanner driver, or other device drivers, web pages, content files, metadata, playlists and other files. Persistent storage medium/media 1206 can further include program modules/program logic in accordance with embodiments described herein and data files used to implement one or more embodiments of the present disclosure.

Figure 13:
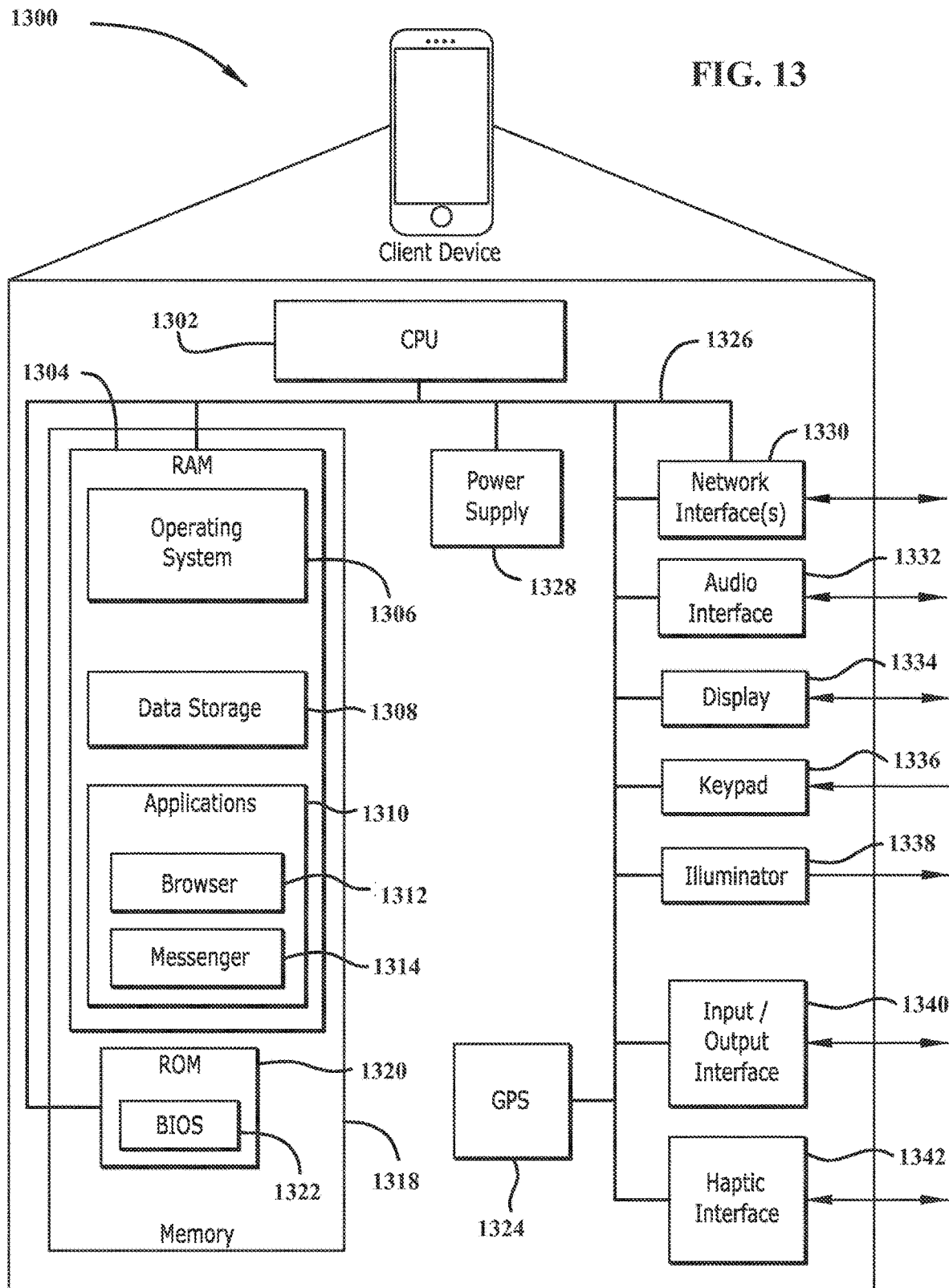
FIG. 13 is a schematic diagram illustrating a client device implementation of a computing device in accordance with embodiments of the present disclosure.

FIG. 13 is a schematic diagram illustrating a client device implementation of a computing device in accordance with embodiments of the present disclosure. A client device 1300 may include a computing device capable of sending or receiving signals, such as via a wired or a wireless network, and capable of running application software or "apps" 1310. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1302, power supply 1328, a memory 1318, ROM 1320, BIOS 1322, network interface(s) 1330, audio interface 1332, display 1334, keypad 1336, illuminator 1338, I/O interface 1340 interconnected via circuitry 1326. Claimed subject matter is intended to cover a wide range of potential variations. For example, the keypad 1336 of a cell phone may include a numeric keypad or a display 1334 of limited functionality, such as a monochrome liquid crystal display (LCD) for displaying text. In contrast, however, as another example, a web-enabled client device 1300 may include one or more physical or virtual keyboards 1336, mass storage, one or more accelerometers, one or more gyroscopes, global positioning system (GPS) 1324 or other location identifying type capability, Haptic interface 1342, or a display with a high degree of functionality, such as a touch-sensitive color 2D or 3D display, for example. The memory 1318 can include Random Access Memory 1304 including an area for data storage 1308.

A client device 1300 may include or may execute a variety of operating systems 1306, including a personal computer operating system, such as a Windows, iOS or Linux, or a mobile operating system, such as iOS, Android, or Windows Mobile, or the like. A client device 1300 may include or may execute a variety of possible applications 1310, such as a client software application 1314 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1300 may also include or execute an application to communicate content, such as, for example, textual content, multimedia content, or the like. A client device 1300 may also include or execute an application to perform a variety of possible tasks, such as browsing 1312, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known.

Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a device, at a user's email account, a plurality of messages from a plurality of senders;
identifying, by the device, a respective sender of each of the received plurality of messages;
determining, by the device, a respective type of each of the received plurality of messages;
generating, by the device, statistics for the received plurality of messages based on the identified respective sender and the determined respective type of each of the received plurality of messages;
providing, by the device, the generated statistics for display to the user on a user device in a user interface associated with the user's email account, the generated statistics enabling identification of senders whose emails need to be blocked, the user interface including an interface object enabling the user to instruct the device to block the messages from the identified senders; and
preventing, by the device, messages from identified senders that are to be blocked from being displayed in an inbox of the user interface associated with the user's email account.

2. The method of claim 1, wherein the generated statistics and the interface object are included in a contacts portion of the user interface associated with the user's email account.

3. The method of claim 2, wherein the interface object is displayed based on generated statistics for the identified senders.

4. The method of claim 1, further comprising:
analyzing previously received messages in the inbox based on information related to the identified senders; and
modifying the inbox to remove previously received messages from the identified senders from being shown in the inbox.

5. The method of claim 1, further comprising:
receiving a request from the user for analysis of the user's email account; and
performing an analysis of the user's email account across the plurality of senders or the plurality of messages.

6. The method of claim 1, wherein the generated statistics comprise at least one of a frequency of messages transmitted by each of the plurality of senders, types of messages transmitted by each of the plurality of senders, and a percentage of messages transmitted by a sender that is transmitting particular types of messages.

7. The method of claim 1, wherein the generated statistics are in a graphical or pictorial representation, wherein the graphical representation of the generated statistics shows the number of messages received in a predetermined time period.

8. The method of claim 1, wherein at least one of the plurality of senders is an individual and the respective type of a received message from the individual is a personal message.

9. The method of claim 1, wherein at least one of the plurality of senders is a business entity and the respective type of a received message from the business entity is an advertisement, a promotion or a message related to a transaction.

10. The method of claim 1, wherein the respective type of each received message is determined based on at least one of a subject line or content of the received message.

11. A non-transitory computer-readable storage medium tangibly encoded with computer-executable instructions, that when executed by a device, perform a method comprising:
receiving, by the device, at an email account of a user, a plurality of messages from a plurality of senders;
identifying, by the device, a respective sender of each of the received plurality of messages;
determining, by the device, a respective type of each of the received plurality of messages;
generating, by the device, statistics for the received plurality of messages based on the identified respective sender and the determined respective type of each of the received plurality of messages;
providing, by the device, the generated statistics for display to the user on a user device in a user interface associated with the user's email account, the generated statistics enabling identification of senders whose emails need to be blocked, the user interface including an interface object enabling the user to instruct the device to block the messages from the identified senders; and
preventing, by the device, messages from identified senders that are to be blocked from being displayed in an inbox of the user interface associated with the user's email account.

12. The non-transitory computer-readable storage medium of claim 11, wherein the generated statistics and the interface object are included in a contacts portion of the user interface associated with the user's email account.

13. The non-transitory computer-readable storage medium of claim 12, wherein the interface object is displayed based on generated statistics for the identified senders.

14. The non-transitory computer-readable storage medium of claim 11, further comprising:
analyzing previously received messages in the inbox based on information related to the identified senders; and
modifying the inbox to remove previously received messages from the identified senders from being shown in the inbox.

15. The non-transitory computer-readable storage medium of claim 11, further comprising:
receiving a request from the user for analysis of the user's email account; and
performing an analysis of the user's email account across the plurality of senders or the plurality of messages.

16. A device comprising:
a processor; and
a non-transitory computer-readable storage medium for tangibly storing thereon program logic for execution by the processor, the program logic comprising:
logic executed by the processor for receiving at an email account of a user, a plurality of messages from a plurality of senders;
logic executed by the processor for identifying a respective sender of each of the received plurality of messages;
logic executed by the processor for determining a respective type of each of the received plurality of messages;
logic executed by the processor for generating statistics for the received plurality of messages based on the identified respective sender and the determined respective type of each of the received plurality of messages;
logic executed by the processor for providing the generated statistics for display to the user on a user device in a user interface associated with the user's email account, the generated statistics enabling identification of senders whose emails need to be blocked, the user interface including an interface object enabling the user to instruct the device to block the messages from the identified senders; and
logic executed by the processor for preventing messages from identified senders that are to be blocked from being displayed in an inbox of the user interface associated with the user's email account.

17. The device of claim 16, wherein the generated statistics and the interface object are included in a contacts portion of the user interface associated with the user's email account.

18. The device of claim 17, wherein the interface object is displayed based on generated statistics for the identified senders.

19. The device of claim 16, further comprising:
analyzing previously received messages in the inbox based on information related to the identified senders; and
modifying the inbox to remove previously received messages from the identified senders from being shown in the inbox.

20. The device of claim 16, further comprising:
receiving a request from the user for analysis of the user's email account; and
performing an analysis of the user's email account across the plurality of senders or the plurality of messages.

* * * * *